Aug. 2, 1960 P. ZENCZAK 2,947,764
METHOD OF PRODUCING, SEPARATING AND RECOVERING
REACTION PRODUCTS FROM BARK
Filed Nov. 10, 1955 5 Sheets-Sheet 1
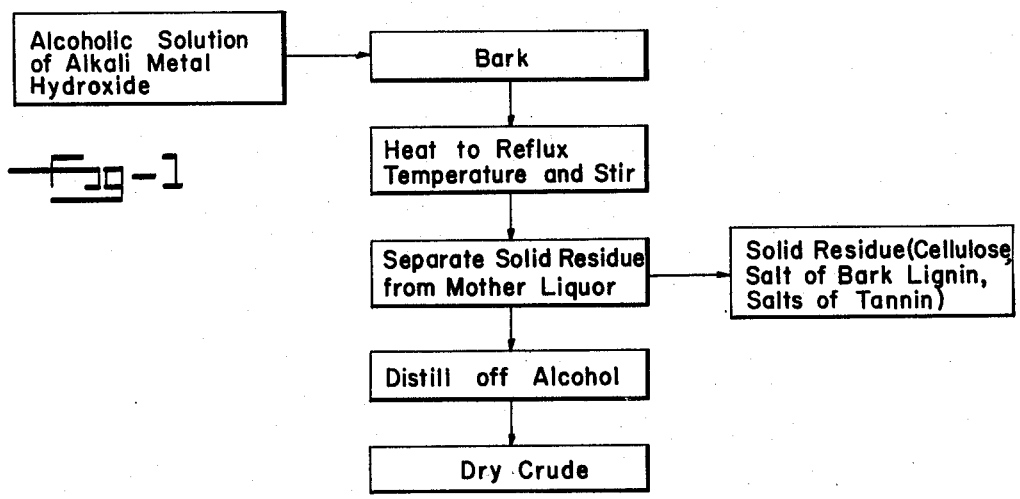
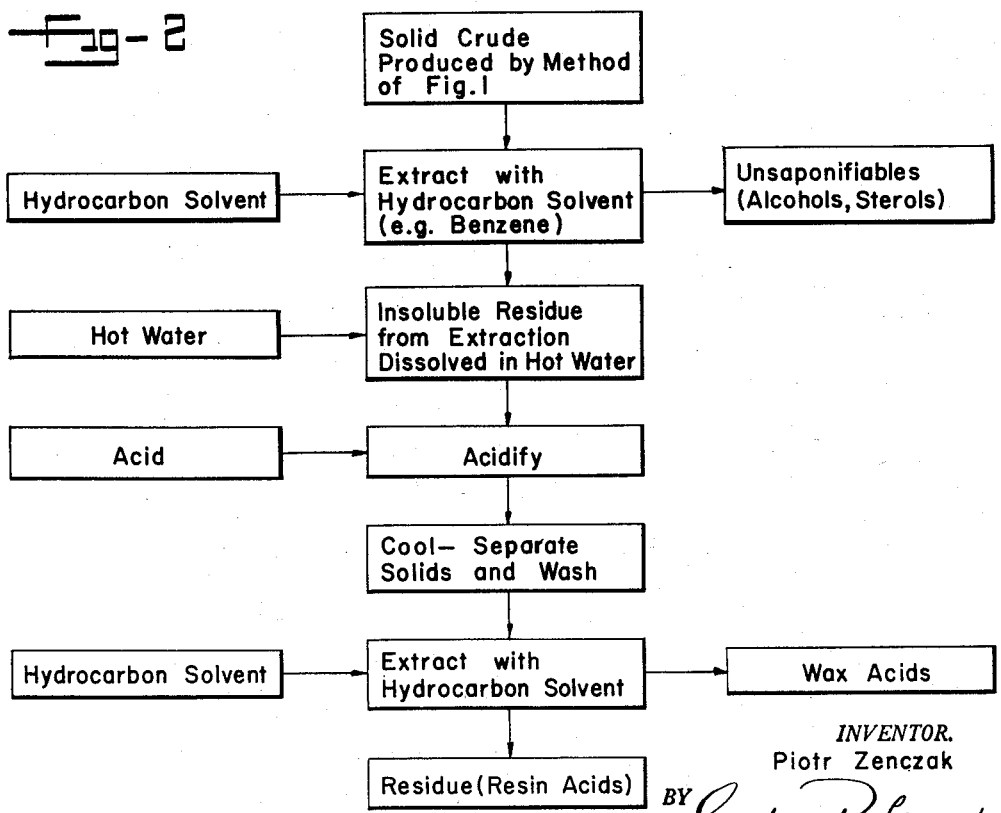
INVENTOR.
Piotr Zenczak
BY Cook & Robinson
Attorneys

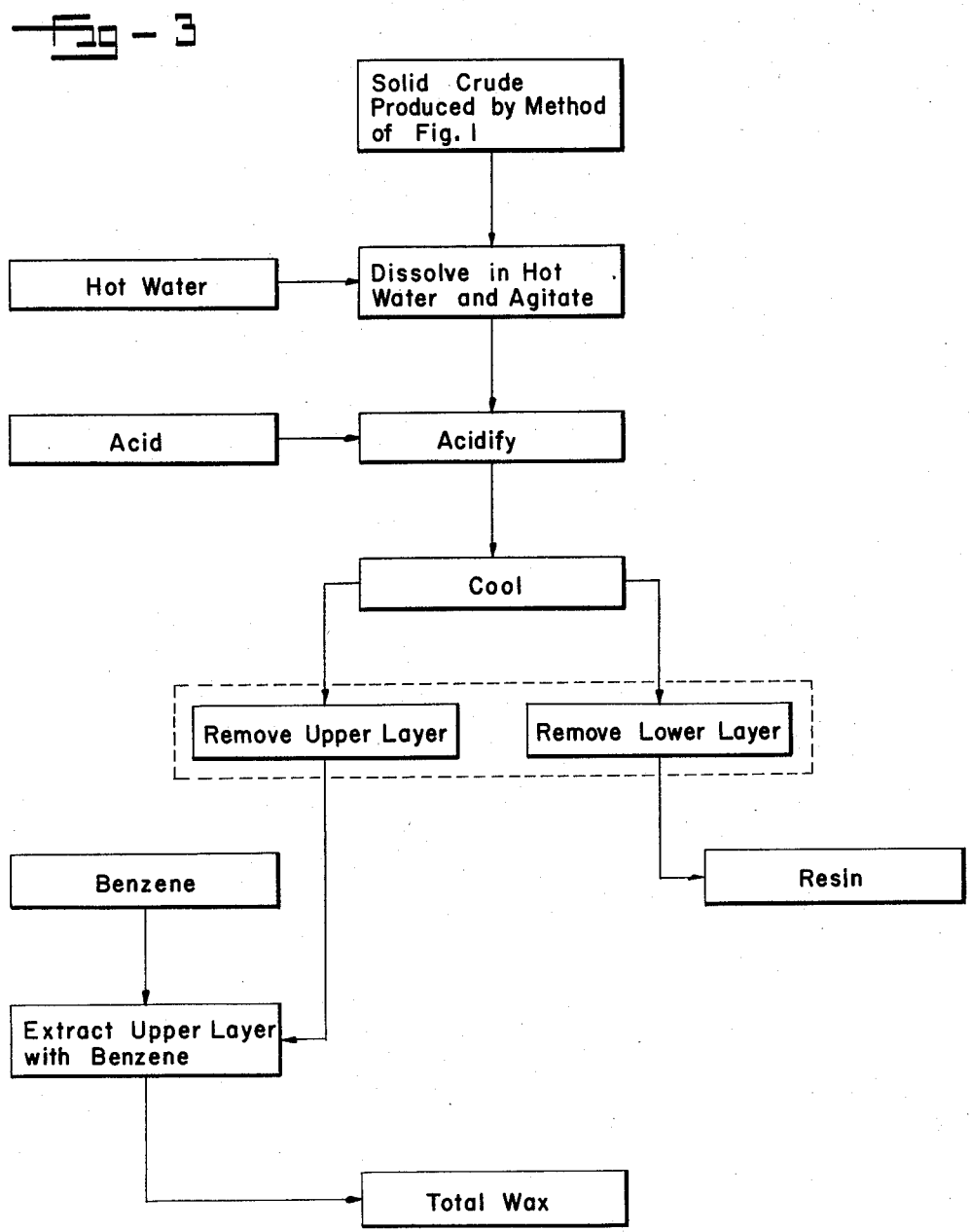

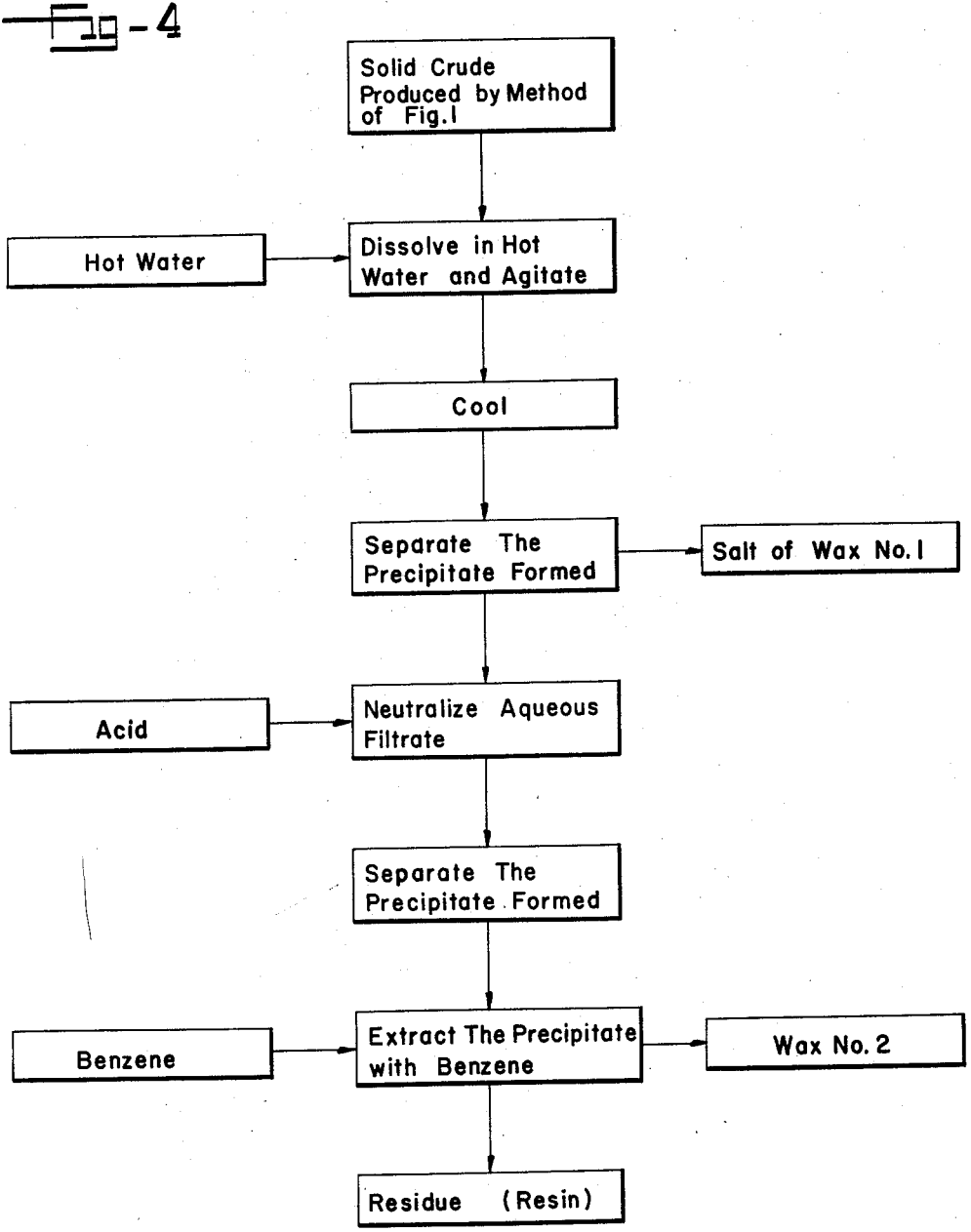

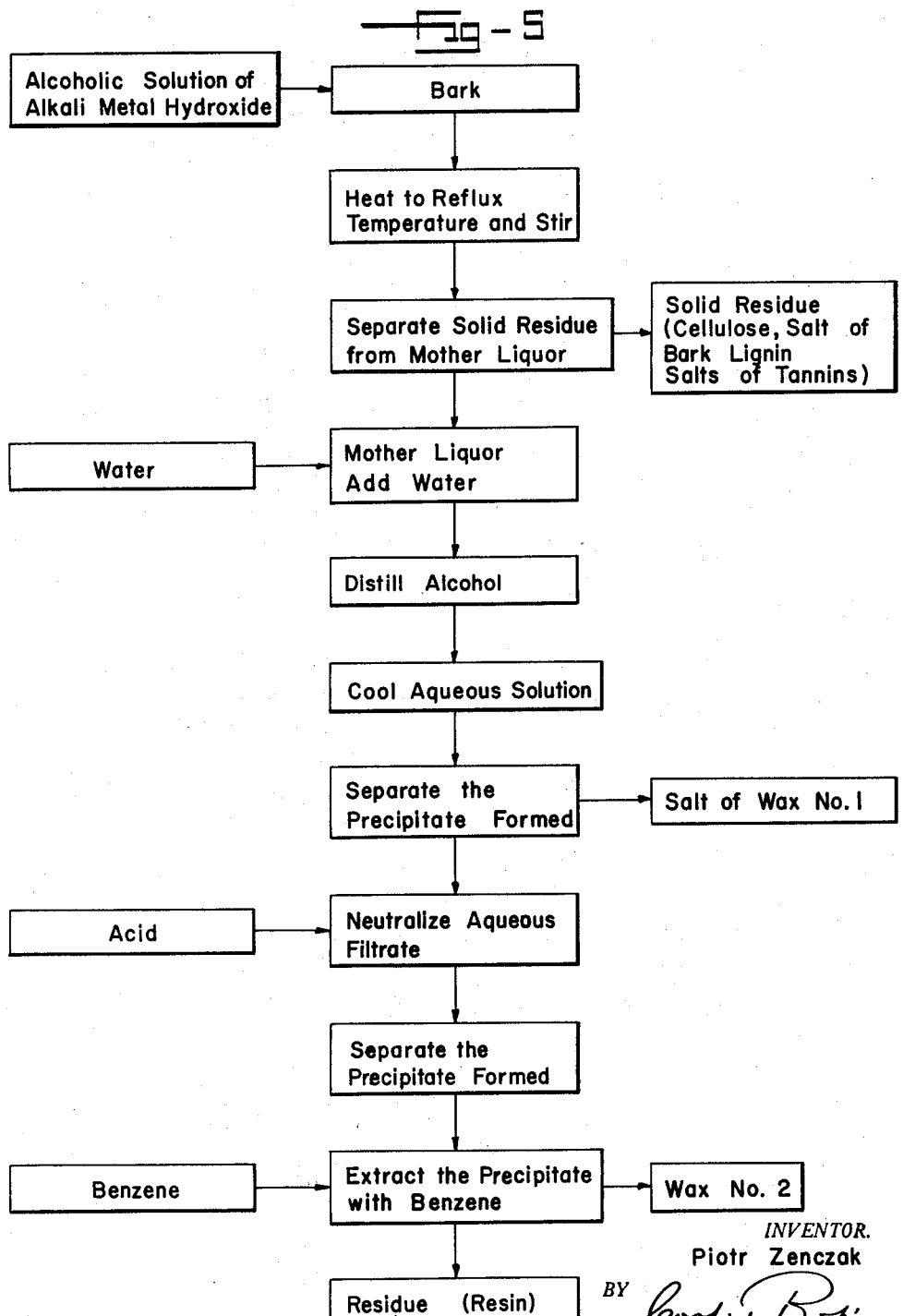

United States Patent Office 2,947,764
Patented Aug. 2, 1960

2,947,764

METHOD OF PRODUCING, SEPARATING AND RECOVERING REACTION PRODUCTS FROM BARK

Piotr Zenczak, Coos Bay, Oreg., assignor to Grenco, Inc., Portland, Oreg., a corporation of Washington Filed Nov. 10, 1955, Ser. No. 546,250

2 Claims. (Cl. 260—397.25)

This invention relates to the treatment of bark and more particularly to the reaction processes for producing, separating and recovering the several distinct fractions or compounds which I designate "bark reaction products."

It is the principal object of my invention to provide new and improved methods or processes whereby new products and heretofore known products may be produced, separated and recovered from bark by a relatively simple and commercially economical technique.

This application is a continuation-in-part of my co-pending applications Serial Number 331,801, filed January 19, 1953, now Patent No. 2,781,336, issued February 12, 1957, and Serial Number 434,635, filed June 4, 1954.

The processes of my invention are not limited to the utilization of bark from a particular species of tree, but are applicable to the treatment of all barks which contain the "bark lignin complex." The bark lignin complex is that part of the bark which is non-carbohydrate. There are portions of the bark lignin complex which are soluble in water and other portions which are soluble in organic solvents. Those portions of the bark lignin complex which are soluble in water and the other portions which are soluble in organic solvents are known as free extractives, and they may be present during my prescribed reaction process or they may be removed prior to reaction without essentially interfering with the reaction. The presence or absence of the "free extractives" will affect only the quantity and specific characteristics of the end products. The specie of tree and the age of the tree from which the bark is obtained will also affect the quantity and specific characteristics of the end products since the specie and the age of the tree influence the development of the lignin complex in the bark. The splitting of the bark lignin complex, which is the essential reaction of my process will take place so long as this bark lignin complex is present under the conditions prescribed for the reaction. I have experimented with bark from several species of trees, such as Douglas fir, pine, cedar, oak and redwood. I have also experimented with barks in their raw state and after they have been extracted with water and with organic solvents. For the purpose of this application, however, the several examples and factual information will be based upon my experiments using Douglas fir bark.

The bark may be reduced and separated into fractions by grinding, screening and/or differential drying. For use in my process, it is desirable to reduce or divide the bark into particles of such size as will pass through a screen which has approximately ⅜" perforations. The moisture content of the bark may range from 5-50 percent of the weight of the bark. For reasons hereinafter disclosed, it is preferable to lower the moisture content of the bark so that the treatment will be carried on in the presence of a minimum quantity of moisture.

In the initial step, the ground or divided bark is placed in an alcohol solution containing an alkali metal hydroxide, such as sodium hydroxide or potassium hydroxide. When the bark is treated with an alcoholic solution of an alkali metal hydroxide, a series of reactions take place. After the initial treatment, the reaction products thereby produced are separated from bark residue and recovered as a solid, crude mass. From this crude mass, I am able to separate and obtain a variety of valuable products such as waxes, resin, fatty acids and alcohols. Further I am able to recover tannins, a mixture of polymers of phenolic acid and cellulosic material from the bark residue.

In the accompanying drawings, I have illustrated the manner in which the bark is treated and the steps by which the products are recovered and the invention disclosed herein will be described with reference to the accompanying drawings wherein:

Fig. 1 is a flow diagram illustrating my process for producing and recovering a crude which is a mixture of the reaction products.

Fig. 2 is a flow diagram illustrating my process for recovering individually useful fatty acids and alcohols from the crude obtained by the process illustrated in Fig. 1.

Fig. 3 is a flow diagram illustrating my process for recovering wax (total wax) and resin from the crude.

Fig. 4 is a flow diagram illustrating my process for recovering particular waxes and resin from the crude.

Fig. 5 is a flow diagram illustrating an alternative process for recovering waxes and resin.

Figure 6:
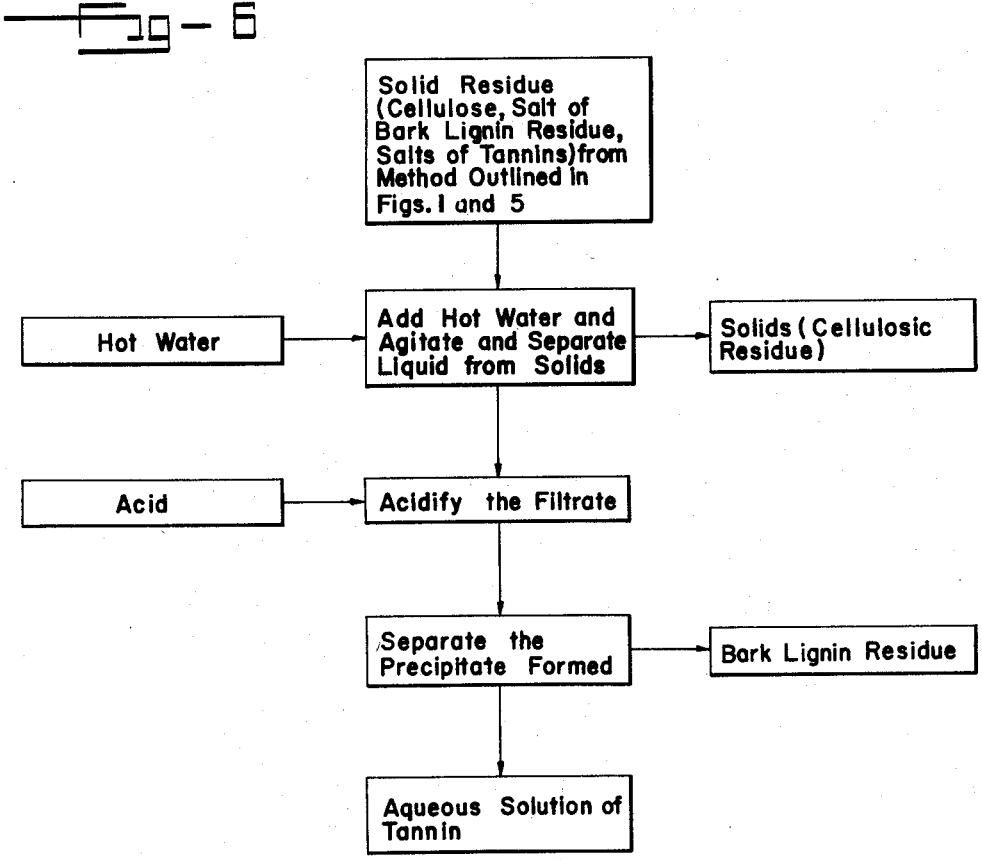
Fig. 6 is a flow diagram illustrating my process for recovering tannins, polymeric phenolic acid and cellulosic material from the bark residue obtained by the process illustrated in Figs. 1 and 5.

In the procedure outlined in Fig. 1, the bark is treated in an alcoholic solution of an alkali metal hydroxide and the treatment may be at room temperature or at any higher temperature up to the boiling point of the solution under pressure feasible with usual commercial vessels.

Although the moisture content of the bark may vary from 5 to 50 percent of the weight of the bark, the total amount of water present during the reaction process should not exceed 15% of the total weight of the reacting materials, such as the alkali metal hydroxide, the alcohol and the bark. The alcoholic solution is produced by dissolving the alkali metal hydroxide in a lower aliphatic saturated alcohol such as 95% ethyl alcohol or commercial methanol of about 99.5% purity or a combination of ethyl alcohol and methanol. Other alcohols may be used in combination with ethanol and methanol but the extent to which other alcohols are used will decrease the reaction efficiency of the solution. The concentration of the alkali metal hydroxide in the alcohol may vary from 2.5% to 50% of the weight of the alcohol. The upper limit of the concentration depends upon the ability of the alcohol to dissolve the alkali metal hydroxide. The ability of the alcohol to dissolve the alkali metal hydroxide depends in turn on the temperature of the alcohol, the particular alcohol combination used, the presence of water in the alcohol, and the particular alkali metal hydroxide used. It is noted for instance that when isopropyl alcohol is introduced into the alcohol combination, a lesser amount of alkali metal hydroxide can be dissolved and also when sodium hydroxide is used a lesser amount of the sodium hydroxide is taken up in the alcohol than when potassium hydroxide is used.

During the reaction treatment of the bark, there must be sufficient alcoholic solution present to insure adequate contact between the bark particles and the solution. The volume of the alcoholic solution required is also governed by the amount of water present in the bark, since as previously explained, the total amount of water present should not be above 15% of the total weight of the reacting materials (alcohol, alkali metal hydroxide and bark). As greater amounts of water are introduced by any of the reacting materials, the volume or quantity of alcoholic solution must be increased to offset the effect of this water. It is preferable to use dry bark or bark with a reduced moisture content and the alkali metal hydroxide should be in dry, flake form. These factors are interrelated and broadly they govern the results of the specific reaction which I will hereinafter describe and which is the subject of this application. Although several combinations of the reacting materials may be used within the limits set out above and although higher temperatures and pressures and agitation will speed the rate of reaction and the penetration of the solution into the bark particles, I have found that satisfactory results can be obtained with the following proportions of reacting materials used under the following conditions:

One part of Douglas fir bark of 25% moisture content was added to five parts ethanol in which was dissolved sodium hydroxide in an amount equal to 3% of the weight of the ethanol. The alcohol solution was formed by introducing the sodium hydroxide to hot alcohol and stirring until dissolved. The hot alcoholic solution was then added to the bark in a reflux flask and these materials were cooked under reflux conditions and at the reflux temperature of the alcohol.

If bark is treated with aqueous solution of an alkali metal hydroxide, the lignin salts formed will dissolve in the aqueous solvent. If the water is limited, however, or completely replaced by alcohol in the treatment, then the special desired reaction can take place. The lignin complex salts formed under these conditions will not dissolve in the alcoholic solution of an alkali metal hydroxide and since the salts do not dissolve, then under the conditions provided, catalytic cleavage of the lignin complex takes place with the formation of new compounds soluble in the alcoholic solution of alkali metal hydroxide. These new compounds can be separated from the residual lignin salt formed from the splitting and which is not soluble in the alcoholic solution. Several experiments were carried out to demonstrate the insolubility of this residual lignin salt and it was found that as the concentration of the alkali metal hydroxide in alcohol was increased, then greater amounts of residual lignin salt were retained in the bark as resinous material. Conversely, as the solution strength of the alkali metal hydroxide was reduced, greater amounts of the lignin complex accumulated as resinous material in the liquor which was filtered from the cooked bark. The main reaction described actually occurs as the result of three supporting reactions.

(1) Fission of fatty and hydroxy fatty acid complexes (etholides) from bark lignin.

(2) Hydrolysis of etholides into single acids and hydroxy acids.

(3) Saponification of esters originally present in the bark into acids and alcohols and conversion of all acid components into salts.

The mechanism of the first reaction is not fully characterized although probably it is a fission of ether linkages in the bark lignin molecule. This fission of bark lignin produces fatty acids and hydroxy fatty acid complexes. These fatty acids are not present in raw bark and are not obtainable directly from bark in the form or in the amount in which they are obtained by the processes described herein.

The second reaction, occurring when bark is treated in an alcoholic solution of alkali metal hydroxide under the foregoing conditions, is hydrolysis of hydroxy acids polymeric complexes (etholides). These etholides are esters of acids containing hydroxyl groups and the esters have been produced by the radical of the acidic constituent entering into esterification with the molecule of the hydroxy acid. Some barks, such as oak, and pine, contain small amounts of naturally present etholides. These etholides, like those formed by my treatment of bark, are hydrolized into single acids. Both reactions, the fission of the bark lignin and the hydrolysis of etholides, requires essentially an anhydrous alcoholic solution of an alkali metal hydroxide of a minimum 2.5% strength. It has been reported that the etholides present in oak cork undergo transesterification when treated in a weak (0.5–0.7%) alcoholic solution of alkali metal hydroxide. (Guillemonat U.S. Patent No. 2,617,814.)

The third reaction which takes place when the bark is treated with alcoholic solution of alkali metal hydroxide is the well known saponification of the esters and conversion of all acidic components, including bark lignin residue, into salt.

The three reactions described above are inter-dependent and occur as a single progressive step when bark is treated with an alcoholic solution of alkali metal hydroxide in accordance with my process. My contention that new products are produced is believed to be substantiated by the fact that these new products can be obtained from bark from which all extractives (waxes, etholides and tannin) have been previously removed.

Subsequent to the cooking or treatment of the bark with the alcoholic solution of alkali metal hydroxide, the mother liquor is separated from the insoluble bark residue. This separation may be accomplished by any desired means, such as filtration, decantation or centrifuging. So far as possible, the valuable reaction products are removed in the mother liquor. The solid bark residue, separated from the liquor, may be washed with alcohol to recover additional quantities of the reaction products. After the liquor and insoluble bark residue have been separated, the alcohol is recovered from the liquor by distillation. The remaining substance is a solid mixture of the many compounds which have been produced and separated from bark. The solid residue obtained after distillation of alcohol, will herein be referred to as a "crude." It is a dark brown mass which, when completely dry, can be readily ground to a fine powder. This powder is a mixture of the alkali metal hydroxide used in the process and the organic reaction products which are produced and recovered from bark.

The crude, so obtained, can be processed to separate and recover valuable products such as waxes, resin and individual acids and alcohols by one of the processes illustrated in flow diagrams Figs. 2, 3 and 4.

It is now possible to separate and recover from the crude individual acids and alcohols as important and valuable products. The steps of this process are illustrated in Fig. 2. The process is designed to isolate the individual acids and alcohols which are present or synthesized from bark during the process of obtaining the crude. In the separation and recovery process, the solid crude is extracted with an organic solvent, such as aliphatic, aromatic or lower halogenated hydrocarbons, or lower aliphatic ketones and ethers. In most of my experiments, I have used hexane or benzene as the solvents. After solvent extraction of the crude, the solvent may be readily recovered by distillation and a waxy material is obtained as a residue. This residue represents the total amount of unsaponifiables and consists mainly of fatty alcohols and sterols. The individual alcohols and sterols can be obtained and separated by selective solvent extraction and crystallization.

The residual crude, after the extraction of unsaponifiables, is next dissolved in hot water and acidified with diluted mineral acid, for example, sulphuric acid. After acidification, the mixture is cooled and the solid separated from the aqueous solution by filtration. The solids obtained contain acidic components of the crude. The wax acids are then separated from resin acids by extraction with hot, lower aliphatic or aromatic hydrocarbon solvent, such as hexane or benzene. The wax acids can be separated into components by selective solvent extraction and crystallization. The resin acids are present in the form of complex mixtures which can not readily be separated into their individual components, therefore, they are left as a resinous matter and used in this form.

An alternative procedure whereby the total wax content and the resin content of the crude may be recovered is outlined in Fig. 3. In accordance with the alternative procedure, the crude is dissolved in hot water and the solution is acidified when hot with acid, such as diluted sulphuric acid, to a pH of 2. The mixture is stirred when hot and on cooling a waxy solid separates from the water as an upper layer (specific gravity less than water) and a lower layer (specific gravity more than water) separates as a resinous solid. First, the upper layer is removed, next the lower layer is recovered by draining away the aqueous solution. The waxy and resinous solids are dehydrated and separately or in combination they are extracted with benzene. The benzene extract contains the total wax present. A solid wax is obtained by distilling the benzene. This is the total wax illustrated in Fig. 3. The residue is a resin.

In accordance with the process outlined in Fig. 4, the crude is first dissolved in hot water. The equeous solution of the crude is next cooled and upon cooling a precipitate is formed which is removed by filtration. The precipitate is a combination of the lignoceryl alcohol, sterol and lignoceric acid fractions present in the crude. This precipitate, recovered in salt form, is washed in cold water and neutralized with an acid and dried. The product so obtained is a wax which I designate as a "wax No. 1" in Fig. 4. The aqueous solution, after separation of the salt of wax is next neutralized with an acid, such as sulphuric acid and a resinous precipitate formed on neutralization is separated by filtration from the aqueous filtrate. This resinous precipitate is extracted with benzene; however, chlorinated hydrocarbon solvents, such as carbon tetrachloride can be used. From the extraction, a second wax is obtained. This is "wax No. 2" in Fig. 4. The resin residue remaining after extraction of wax No. 2 is the resin designated in Fig. 4.

The process illustrated in Fig. 5 is the subject matter of my previously identified co-pending applications and is similar in many respects to the processes illustrated in the combination of Figs. 1 and 4. In this alternative procedure, the solid crude is not obtained, but as is illustrated in Fig. 5, water is added to the mother liquor prior to removal of the alcohol. The aqueous solution is then processed similar to the processes illustrated and described pertaining to Fig. 4. The wax and resin recovered by this process are substantially identical to those recovered by the procedures outlined in the combination of Figs. 1 and 4. In a later example, I will describe in detail the method or procedure for carrying out this alternative process.

The solid residue obtained from the process for producing of the crude, as illustrated in Fig. 1, consists primarily of a salt of bark lignin, residue salts of tannins and cellulosic material present initially in bark. This mixture is processed and separated into components as illustrated in Fig. 6. It contains, besides the components mentioned above, residual alcohol and alkali metal hydroxide which has been used in the process. The alcohol is recoverable by heating or steam distillation. To the solid, free from residual alcohol, 5 to 10 parts of hot water is added and the mixture is well stirred, and the liquor is filtered from the insoluble part. The insoluble part contains mainly cellulosic residue. The filtrate is neutralized with a strong acid, such as sulphuric acid to a pH 2 and the precipitate formed is separated by filtration from the water which contains the water soluble components of the bark, mainly uncondensable tannin. The bark lignin residue so obtained is a light brown paste which, when dry, is yellow-brown finely divided, water insoluble, amorphous powder. Chemically, this bark lignin residue is active and condenses with furfural and phenol at room temperature and it is partly soluble in acetone, alcohol, ether or chloroform. It is completely soluble in diluted sodium hydroxide. The properties of this bark lignin residue make it useful as an adhesive and under pressure and in presence of water, it flows at a temperature of 130° C. Under acidic conditions, a water proof exterior type plywood glue or binder for hardboard may be prepared. It may be molded under heat and pressure and it may be modified with filler and/or a plasticizer for this purpose.

Chemically, this active bark lignin residue is a different composition than the bark lignin as known to exist in the bark of a tree. From the original bark lignin the waxes and resin are produced and removed and the residual component, mainly a polymer of phenolic acid of unknown structure, is recovered.

The aqueous solution of tannin obtained by this process can be concentrated to dryness by evaporation under reduced pressure. The tannin extract is a very effective viscosity reducing agent. It is obtained in addition to the other valuable products recovered from bark and therefore can be produced very economically.

The following specific examples illustrate the method employed and products obtained in accordance with the teaching of the present invention.

*Example No. 1*

Twenty pounds of Douglas fir bark was ground in a hammermill to pass a ⅜ inch screen. The moisture content of bark was 16% of the dry weight of the bark. The prepared bark was placed in a fifty gallon reaction vessel equipped with stirrer, hot water jacket and condenser. Prior to the addition of the bark, 15 gallons of 95% ethyl alcohol was pumped into the vessel and four pounds of sodium hydroxide flakes was added. The alcohol and sodium hydroxide flakes were heated to 90° C. to form the alcohol sodium hydroxide solution. The bark was added and the bark and the liquor solution were heated to the reflux temperature under 5 to 10 p.s.i. of alcohol vapor pressure. After two hours of cooking, with stirring, the solid bark residue was separated from the liquor by filtration through a filter located on the bottom of the reaction vessel. The filtrate was drained direct into a heated distilling vessel equipped with a condensor so that the alcohol was continuously distilled off thus leaving on the bottom of the distilling vessel a dark brown, solid material referred to in this application as a crude. The dry weight of the crude was five pounds or 25.4% of the dry weight of bark.

*Example No. 2*

500 grams of dry crude obtained as described in Example No. 1 was twice extracted with benzene in an extraction flask at the reflux temperature. 1000 ml. of benzene was used. The benzene extract was then separated while hot by filtration from the insoluble residue and the hot benzene extract solution was treated with 5 grams of activated clay. It was next filtered and concentrated to 500 ml. After cooling the concentrated benzene solution, white crystals formed and these were recovered by filtration. The yield was 26 grams or 5.2% of the weight of the crude.

The benzene filtrate liquor was distilled and the residue was dissolved in 500 ml. of hot acetone. From the acetone, after cooling, an additional 10 grams of white crystals were recovered. This, when added to the previous yield, gave a total yield of crystals of 36 grams or 7.2% of the weight of the crude. The melting point of the recovered crystalline compound was 70° C. From this melting point and from infra-red absorption spectrum and oxidation with soda-lime, it was concluded that the compound was lignoceryl alcohol.

The acetone filtrate, separated from the second group of crystals of lignoceryl alcohol, was then distilled and the solid residue remaining after distillation was a light waxy substance. The yield of this substance was 15 grams or 3% of the weight of the crude. This substance was next dissolved in 400 ml. of warm, diluted 75% ethyl alcohol and from this solution, after cooling, light yellow crystals in the form of shiny scales were obtained. These crystals were identified by infra-red absorption spectrum, melting point (130° C.) and digitonin test as being phytosterol.

The residual of the original solid crude after extraction of the lignoceryl alcohol and phytosterol, was dissolved in hot water and neutralized with diluted sulphuric acid. Upon cooling, the water insoluble solid acidic components were separated by filtration. After washing to remove all water solubles and then drying, approximately 350 grams of dry solids were obtained or 70% of the weight of the crude. This solid was extracted with 2000 ml. of hot benzene. The benzene extract was decanted from the insoluble resin residue. The benzene extract, after distillation of the benzene, yielded 195 grams (39% of the weight of the crude) of wax acids.

Next, the total wax acids were extracted with 200 ml. of hot hexane. The hexane extract was decanted from insoluble residual solids. White crystals were recovered from the hexane extract after the treatment with activated clay, filtration and cooling. The weight of these crystals was 75 grams or 15% of the weight of the crude. The characteristics of these crystals were as follows:

Melting point (A.S.T.M. ° C.) 75 after recrystallization from alcohol 80° C.
Neutralization equivalent 354.
The infra-red absorption spectra was typical for normal saturated fatty acids.

From the data it was concluded that the crystals are crystals of lignoceric acid (tetracosanoic acid). The lignoceric acid so obtained is reasonably pure but not chemically pure.

The hexane liquor filtrate was concentrated and an additional 20 grams of solid lignoceric acid crystals was obtained, bringing the yield of this acid to a total of 95 grams or 19% of the weight of the crude.

The residue, insoluble in hexane, was a brown wax and contained a mixture of wax acids. These acids were not separated or identified. The benzene insoluble resin acids, after removal of benzene by steam distillation and drying, weighed 150 grams or 30% of the weight of the crude.

*Example No. 3*

200 grams of dry powdered crude obtained in accordance to the method described in Example No. 1 was dissolved in 1000 ml. of boiling water. The solution was next acidified with diluted hydrochloric acid while hot to a pH of 2. The mixture was stirred well and allowed to cool. On cooling, a brown waxy solid was formed as a top layer and resinous mass settled on the bottom of the beaker.

The solidified waxy layer was removed from the beaker and remelted. The weight of the wax was 120 grams or 60% of the crude. This wax was next dissolved in hot benzene to which about 15 grams of activated clay was added and the solution was heated and stirred for five minutes. The benzene solution was then filtered hot to remove the clay. The benzene was recovered by distillation and a light brown wax was obtained in yield of 95 grams or 47.5% of the weight of the crude. The resinous layer was dried in an oven at 100° C. Its dry weight was 35 grams or 17.5% of the weight of the crude.

*Example No. 4*

200 grams of dry powdered crude, obtained according to the method described in Example No. 1 was dissolved in 800 ml. of boiling water. The aqueous solution was cooled and on cooling a heavy precipitate was formed. This precipitate was separated from the mother liquor by filtration. The precipitate was washed twice with cold water producing a snow white cake of sodium salt of wax No. 1 (Fig. 4). This salt was then dissolved in boiling water and neutralized with sulphuric acid. On neutralization a precipitate was formed which, after filtration, was melted, giving a hard, light yellow wax. The wax had the following characteristics:

| | |
|---|---|
| Melting point (A.S.T.M. ° C.) | 72–74 |
| Saponification number | 139–142 |
| Acid number | 96–105 |
| Ash percentage | Nil |
| Penetration (100 grm. 5 sec. at 25° C.) | 3–5 |

The yield of this wax was 60 grams or 30% of the weight of the crude.

The alkaline, aqueous solution obtained as a filtrate upon removal of the salt of wax No. 1, was neutralized with sulphuric acid. The neutralization produced a yellow resinous precipitate of strong aromatic odor and the precipitate was separated by filtration from aqueous liquor. The yellow resinous substance was then dehydrated by melting. The weight of the melted resin was 91 grams or 45.5% of the weight of the crude. This resin was extracted with benzene in a small Soxhlet extractor. After the benzene was removed by distillation, a brown wax was obtained. This wax is wax No. 2 of Fig. 4. Yield of this wax was 29 grams or 15% of the weight of the crude.

Properties of wax No. 2 are as follows:

| | |
|---|---|
| Melting point (A.S.T.M. ° C.) | 65 |
| Saponification number | 177 |
| Acid number | 144 |
| Ash percentage | Nil |
| Penetration (100 grams 5 sec. at 25° C.) | 13 |

This wax was purified with diatomaceous earth and upon crystallization from the benzene a hard, light color wax was obtained. The melting point of the wax was 110–115° C. The wax No. 2, when extracted by benzene from the resin wax precipitate, is a mixture of a soft, low melting fraction and of a hard, high melting fraction. The high melting fraction of wax No. 2 crystallizes on cooling of the benzene solution leaving the low melting fraction in solution. The soft, low melting fraction of this wax, when treated with small amounts (0.1 to 1%) of metallic oxides such as zinc oxide and magnesium oxide, can be converted to a higher melting, hard wax. The resinous residue remaining after extraction of wax No. 2 is the resin referred to in Fig. 4. It is dark brown in color and possesses strong adhesive properties. When heated under acidic conditions, it gels to form a rubbery, slightly thermoplastic substance. The resin is a complex mixture of hydroxy acids, unsaturated and saturated fatty acids. It is soluble in alcohol, acetone, ether and a dilute solution of sodium hydroxide. It is insoluble in hydro-carbon solvents. The yield was approximately 30% of the weight of the crude.

*Example No. 5*

200 grams of Douglas fir bark was ground to a fine powder consistency. The ground bark which had a moisture content of about 15% was deposited in an extraction flask. To this was added one liter of 3% alcoholic (95% ethanol) solution of sodium hydroxide and the mixture was heated to boiling temperature under a reflux condenser. After two hours of cooking, the solid residue was filtered from the mother liquor and washed with hot ethanol. The solid residue may be processed further according to the procedure described in Example No. 6 and the filtrate was treated as follows:

200 milliliters of warm water was added and the ethanol was recovered by distillation. The aqueous solution was cooled and on cooling a heavy precipitate was formed. This precipitate was separated from the mother liquor by filtration. It was washed twice with ice cold water producing a snow white cake of sodium salt of wax No. 1, Fig. 5. This salt was then dissolved in hot water (70° C.), neutralized with sulphuric acid and washed with water. On neutralization, a white precipitate was formed which, after filtration, was melted, giving a hard, light yellow wax. The wax had a melting point of 73° C. The yield was 10.5% of the dry weight of the bark.

The alkaline aqueous solution, obtained as a filtrate upon removal of the salt of wax No. 1, was neutralized with sulphuric acid. The neutralization produced a yellow, resinous precipitate of strong aromatic odor and the precipitate was separated by filtration from aqueous liquor. This yellow, resinous substance was then dehydrated by melting. The weight of the melted resin was 12% of the dry weight of the bark. It was then extracted with benzene in a small Soxhlet extractor. After the benzene solution was removed by evaporation, a brown wax was obtained. The yield of this wax was 6% of the dry weight of the bark. This wax is wax No. 2 of Fig. 5. The residue was a dark, sticky resin which was thermoplastic but on heating gelled to form a rubbery substance. This resin was tested as an adhesive for wood and as a binder in hardboards and was found to have good adhesive properties.

*Example No. 6*

To the 200 grams of dry (alcohol free) solid residue obtained from Example No. 1, 2000 ml. of hot water was added and the mixture was well stirred, filtered and again washed with fresh hot water to separate the soluble components from the insoluble part. The insoluble part consists mainly of short, cellulose fibers. The yield of this cellulosic residue was 90 grams or 45% of the weight of starting material.

The filtrate was a dark brown, alkaline aqueous solution of polymeric phenolic acid (bark lignin residue). This solution was acidified with diluted hydrochloric acid to pH 2 and the precipitate formed was separated from mother liquor by filtration. The precipitate was a light brown paste which was dried in an oven at 50° C. After drying, 50 grams or 25% of the weight of the starting material of brown, fine amorphous powder was obtained. This material gave positive reaction for phenol and contained free carboxyl groups. Some of the other properties of this material were hereinbefore described.

In this patent application this material is called polymeric phenolic acid or bark lignin residue. The filtrate separated from bark lignin residue contained water soluble tannin. It was evaporated under vacuum at 70° C. to dryness and gave 20 grams of dark brown powder or 10% of the weight of starting material.

As used herein the terms have the following meanings:

Lignoceryl alcohol (1-tetracosanol) $C_{24}H_{49}OH$ and includes closely related long-chain alcohols.

Lignoceric acid ($C_{24}H_{48}O_2$) likewise includes closely related long-chain acids.

Phytosterol is a sterol fraction in which that type of sterol predominates but may not be the only one present.

The term "activated earth" refers to those earths commonly used for decolorizing purposes, of which a well known brand is "Filtrol."

It is to be understood and anticipated that whole bark may be processed and treated by numerous methods or processes to separate the bark lignin complex from the cellulose. It is, therefore, my intention and desire that the scope of my invention shall include and be applicable to the production, separation and recovery of reaction products from any material or substance wherein the bark lignin complex is present in a free state or as part of a composition and wherein the herein described processes are utilized to produce the reaction products. In the claims, the term "bark substances" will be used as a generic term to include free bark lignin complex and any and all forms of bark or fractions of bark which contain the bark lignin complex.

Having thus described my invention, what I claim as new therein and desire to secure by Letters Patent is:

1. The process of removing unsaponifiables from a crude mass obtained from bark by treating the bark in alcoholic solution of alkali metal hydroxide and separating the liquor from the solid residue and then removing the alcohol to obtain the crude mass, the process comprising extracting the crude mass with a hydrocarbon solvent selected from the group consisting of hexane and benzene, concentrating the hydrocarbon solvent solution, dissolving the concentrate in acetone wherein white crystals are formed, filtering to separate the crystals from the acetone solution, concentrating the acetone solution by distillation, dissolving the concentrate in ethyl alcohol wherein light yellow crystals are formed and removing the light yellow crystals from the solution.

2. The process of removing unsaponifiables from a crude mass obtained from bark by treating the bark in alcoholic solution of alkali metal hydroxide and separating the liquor from the solid residue and then removing the alcohol to obtain the crude mass, the process comprising extracting the crude mass with a hydrocarbon solvent selected from the group consisting of hexane and benzene to remove the unsaponifiables from the crude mass, separating the solution from the remaining solids by filtration, dissolving the solids in a hot aqueous solution of sulphuric acid, cooling the solution, filtering to remove the insoluble acidic components from the solution, extracting the solids with benzene to remove the benzene extractables, distilling to remove the benzene and recovering wax acids, extracting the wax acids with hexane and recovering white crystals of lignoceric acid.

References Cited in the file of this patent

UNITED STATES PATENTS

| | | |
|---|---|---|
| 2,037,001 | Aronovsky | Apr. 14, 1936 |
| 2,662,893 | Kurth | Dec. 15, 1953 |
| 2,676,980 | Tu | Apr. 27, 1954 |
| 2,729,656 | Berry et al. | Jan. 3, 1956 |
| 2,781,336 | Zenczak | Feb. 12, 1957 |

FOREIGN PATENTS

| | | |
|---|---|---|
| 8,816 | Great Britain | May 4, 1888 |
| 16,440 | Great Britain | Feb. 17, 1910 |
| 665,002 | Germany | Sept. 14, 1938 |